United States Patent

Takino et al.

Patent Number: 6,073,747
Date of Patent: Jun. 13, 2000

[54] ARTICLE DIVERGING SORTING APPARATUS

[75] Inventors: Shigekatsu Takino; Shinichi Hayashida; Shigeo Fukumori, all of Saitama-ken, Japan

[73] Assignee: Tsubakimoto Chain Co., Osaka, Japan

[21] Appl. No.: 09/237,525

[22] Filed: Jan. 27, 1999

[51] Int. Cl.$^7$ .................................................. B65G 47/46
[52] U.S. Cl. ......................................................... 198/370.09
[58] Field of Search ............................ 198/370.09, 371.3

[56] References Cited

U.S. PATENT DOCUMENTS

| | | | |
|---|---|---|---|
| 4,746,003 | 5/1988 | Yu et al. | 198/370.09 X |
| 5,029,693 | 7/1991 | Williams | 198/370.09 |
| 5,480,022 | 1/1996 | Matsuda et al. | 198/370.09 X |

FOREIGN PATENT DOCUMENTS 9240819  9/1997  Japan .

*Primary Examiner*—James R. Bidwell
*Attorney, Agent, or Firm*—Dann, Dorfman, Herrell and Skillman, P.C.; Henry H. Skillman

[57] ABSTRACT

An article diverging sorting apparatus includes a multiplicity of spherical sorting rollers arranged in plural rows both in a conveyance direction aligned with an article conveyance path or line and in a crosswise direction transverse to the conveyance direction over a plurality of consecutive conveyance areas along the article conveyance line. The spherical sorting rollers contained in every conveyance area are simultaneously turned about respective vertical axes to move between a first position aligned with the conveyance direction and a second position aligned with a sorting direction deflected at an acute angle from the first position such that the angle of deflection of the spherical sorting rollers becomes greater in a downstream one of the conveyance areas than in an upstream one of the conveyance areas. An article is gradually turned or deflected toward the sorting direction as it is conveyed by the spherical sorting rollers. The article is delivered from the downstream conveyance area onto a diverging belt conveyor during which time the orientation of this article is corrected by an orientation correcting member until the article assumes a position aligned with a conveyance direction of the diverging belt conveyor. With this construction, the diverging sorting apparatus can orient articles toward the sorting direction even when the articles are fed at relatively small intervals.

5 Claims, 6 Drawing Sheets

ARTICLE DIVERGING SORTING APPARATUS

BACKGROUND OF THE INVENTION

1. Field of the Invention

The present invention relates to a diverging sorting apparatus used for sorting bundles of newspapers, packed articles and so on (hereinafter referred to, for brevity, as "articles") while they are conveyed.

2. Description of the Related Art

Conventionally, when sorting articles from an intermediate portion of an article conveyance path or line consisting of conveyors or the like onto a branch line extending in a direction intersecting a conveyance direction aligned with the article conveyance line, a sorting apparatus is used, which includes, for example, a multiplicity of groups of synchronously driven conveyor rollers provided on the intermediate article conveyance line portion such that respective orientations of the conveyor roller groups gradually change in a direction from the article conveyance line toward the branch line, and a plurality of parallel arranged narrow belt conveyors oriented toward the conveyance direction of the article conveyance line and vertically movable to project from or retract into spaces between the adjacent conveyor roller groups.

In the conventional sorting apparatus thus constructed, when sorting the articles from the article conveyance line onto the branch line, the vertically movable belt conveyors are held in the retracted position below the conveyor roller groups, so that the articles fed downstream along the article conveyance line are guided by the conveyor rollers toward the branch line while changing their orientations toward the branch line.

Alternatively when advancing the articles downstream along the article conveyance line without sorting, the vertically movable belt conveyors are lifted upwards toward the projecting position in which respective conveyor surfaces of the conveyor belts are located above the conveyor roller groups. The articles are, therefore, transported by the belt conveyors downstream along the article conveyance line past the branched intermediate portion of the article conveyance line.

In the conventional sorting apparatus, however, due to the belt conveyors constructed to project from or retract into spaces between the adjacent conveyor roller groups, intervals between the articles being conveyed should be larger than the length of the belt conveyors. This poses a limit to the efficiency of the sorting operation.

The present assignee has proposed a sorting transfer unit which includes, as disclosed in Japanese Patent Laid-open Publication No. HEI 9-240819, a multiplicity of spherical sorting rollers designed to swing simultaneously to assume two different orientations for enabling sorting of articles even when the articles are fed in succession at relatively small intervals.

The disclosed sorting transfer unit is, however, not fully satisfactory in that because the articles, as they are transferred from an article conveyance line to a branch line, are shifted in a lateral direction, the orientation of the article after sorting is substantially 90° out of phase with the orientation of the article before sorting.

SUMMARY OF THE INVENTION

It is accordingly an object of the present invention to overcome the foregoing difficulties associated with the prior art apparatuses and to provide a diverging sorting apparatus which is capable of orienting articles toward a sorting direction even when the articles are fed in succession at relatively small intervals.

To attain the foregoing object, an article diverging sorting apparatus according to the present invention includes a multiplicity of spherical sorting rollers arranged in plural rows both in a conveyance direction and in a crosswise direction transverse to the conveyance direction over a plurality of conveyance areas provided in succession along an article conveyance line, the conveyance direction being aligned with the article conveyance line. A plurality of roller support frames each support thereon a corresponding one of the spherical sorting rollers for rotation about a horizontal axis. Each of the roller support frames is rotatable at a fixed position about a vertical axis passing substantially through a center of the corresponding spherical sorting roller. A plurality of swing mechanisms are separately operable to turn the roller support frames about respective vertical axes to simultaneously swing the spherical sorting rollers in each of the conveyances area between a first position aligned with the conveyance direction and a second position aligned with a sorting direction deflected at an acute angle from the conveyance direction such that the angle of deflection of the spherical sorting rollers becomes greater in a downstream one of the conveyance areas than in an upstream one of the conveyance areas. A plurality of line shafts are each disposed in parallel with and alongside one of the plural rows of spherical sorting rollers arranged in the crosswise direction of the article conveyance line. The line shafts are in contact with respective spherical outside surfaces of the spherical sorting rollers for frictionally driving the spherical sorting rollers to rotate simultaneously. The apparatus further includes a drive unit for simultaneously rotating the line shafts in synchronism with each other. A diverging belt conveyor having a conveyance direction intersecting the article conveyance direction is disposed with its upstream end positioned close to one side of a group of the spherical rollers contained in the downstream conveyance area. An orientation correcting member is disposed adjacent to the upstream end of the diverging belt conveyor at a side facing upstream of the article conveyance line. The orientation correcting member projects over a conveyor surface of the diverging belt conveyor for engagement with an article to assist change-direction movement of the article when the article is delivered from the spherical sorting rollers to the diverging belt conveyor.

Because the angle of deflection of the spherical rollers becomes greater in the downstream conveyance area than in the upstream conveyance area, the direction of advancing movement of the article and the posture of the article are gradually changed or deflected toward the sorting direction. When the article is about to move onto the conveyor surface of the diverging belt conveyor, the orientation of this article is rectified or corrected until it becomes equal to a conveyance direction of the diverging belt conveyor. Thus the articles are smoothly and accurately oriented toward the sorting direction even when they are supplied at relatively small intervals.

The article conveyance line may further include an additional conveyance area provided in juxtaposition with the downstream conveyance area at an opposite side of the spherical sorting roller group in the downstream conveyance area which is located remotely from the diverging belt conveyor. The additional conveyance area includes a plurality of rows of straight-ahead conveyor rollers fixedly oriented toward the conveyance direction of the article conveyance line.

With this arrangement, even when the spherical sorting rollers in the downstream conveyance areas are turned or deflected in preparation for the sorting of the next following article while the preceding article designed to be advanced in straight lines through the downstream conveyance area is still present in the same conveyance area, the preceding article is advanced by the straight-ahead conveyor rollers in the additional conveyance area toward the downstream side without changing its posture and direction of movement. By virtue of the additional conveyance area provided in juxtaposition with the downstream conveyance area, the article-to-article interval can be reduced further and the efficiency of sorting operation increases further.

The above and other features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Figure 1:
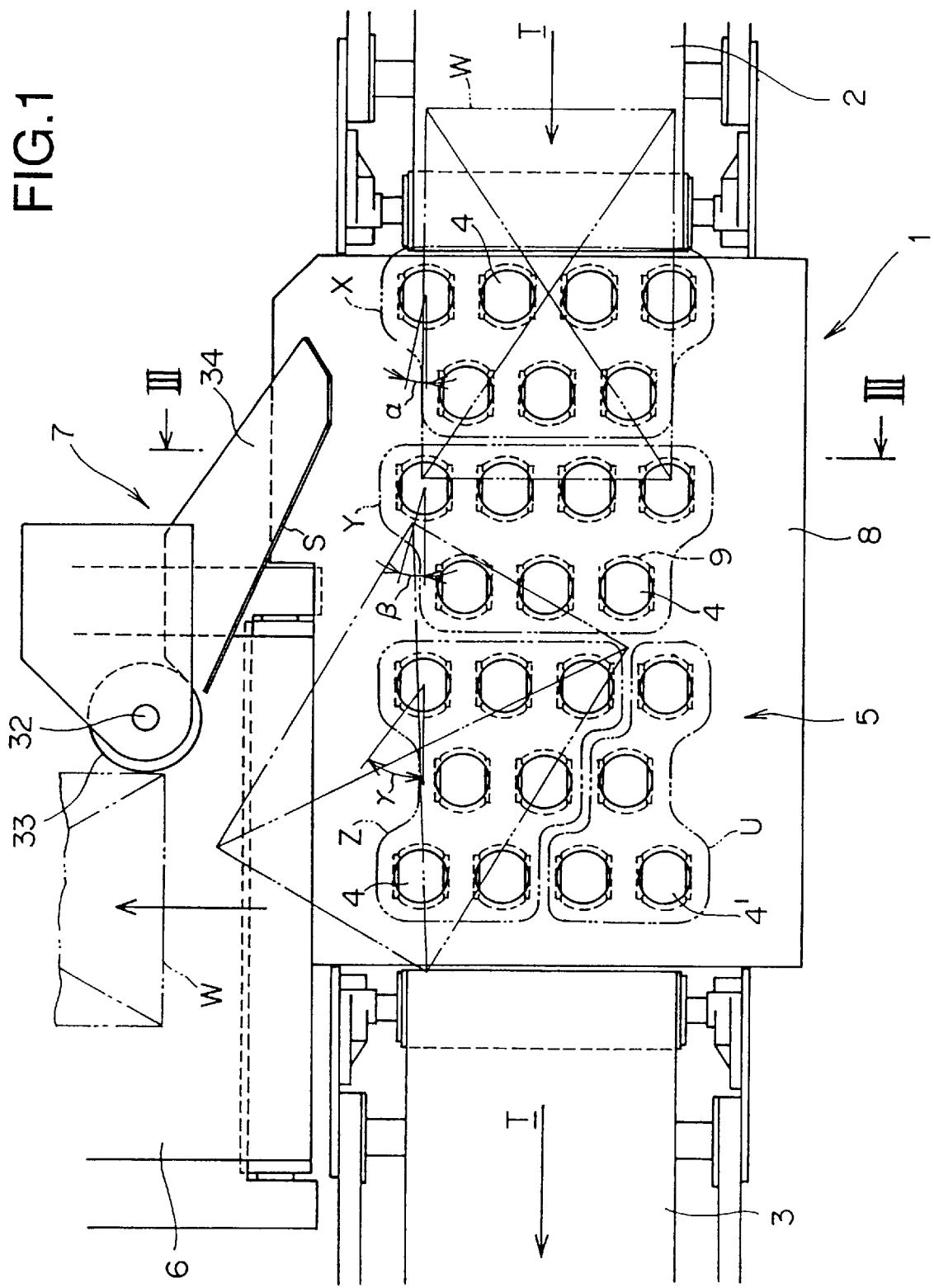
FIG. 1 is a plan view showing an article diverging sorting apparatus according to a first embodiment of the present invention.

Certain preferred embodiments of the present invention will be described in greater detail with reference to the accompanying drawings wherein like or corresponding parts are designated by the same reference characters throughout several views.

Referring now to FIG. 1, there is shown an article diverging sorting apparatus 1 according to a first embodiment of the present invention. The article diverging sorting apparatus 1 is disposed between a first belt conveyor 2 and a second belt conveyor 3 so as to form jointly with the two conveyors 2, 3 a straight article conveyance path or line T. This apparatus 1 generally comprises a sorting transfer unit 5 having a multiplicity of spherical sorting rollers 4 and a plurality of straight-ahead conveyor rollers 4' that form a part of the article conveyance line T, a diverging belt conveyor 6 extending in a direction intersecting the article conveyance line T and disposed with its upstream end positioned close to one side of the sorting transfer unit 5, and an orientation correcting member 7 disposed adjacent to the upstream end of the diverging belt conveyor 6 at a side facing upstream of the article conveyance line T, the orientation correcting member 7 projecting over a conveyor surface of the diverging belt conveyor 6.

As shown in FIG. 1, the spherical sorting rollers 4 provided on the sorting transfer unit 5 are arranged in plural rows both in a conveyance direction and in a crosswise direction over a plurality of conveyance areas X, Y, Z provided in succession along a longitudinal portion of the article conveyance line T in the order named when viewed from an upstream side of the article conveyance line T. The conveyance direction is aligned with the article conveyance line T as indicated by the arrows shown in FIG. 1, and the crosswise direction is transverse to the conveyance direction.

The spherical sorting rollers 4 are so constructed as to turn or swing about their own axes, as will be described later. The straight-ahead conveyor rollers 4' have the same shape and configuration as the spherical sorting rollers 4 and are fixedly oriented toward the conveyance direction of the article conveyance line T. The straight-ahead conveyor rollers 4' are arranged in an additional conveyance area U which is provided in juxtaposition with the conveyance area Z along a side which is remote from the diverging belt conveyor 6. Thus, the conveyance area U is disposed on the opposite side of the diverging belt conveyor 6 across the conveyance zone Z.

The spherical sorting rollers 4 and the straight-ahead conveyor rollers 4' partly project from an upper surface of a cover 8 through part-circular openings or holes 9 for supporting thereon articles W indicated by phantom lines shown in FIG. 1.

To provide a uniform support for the bottom surface of each article W, the spherical sorting rollers 4 and the straight-ahead conveyor rollers 4' are arranged throughout the conveyance areas X, Y, X, U such that a first roller row consisting of four rollers 4 (4') aligned in the crosswise direction and a second roller row consisting of three rollers 4 (4') aligned in the crosswise direction are arranged one after another in a zigzag pattern along the conveyance direction of the article conveyance line T.

Figure 3:
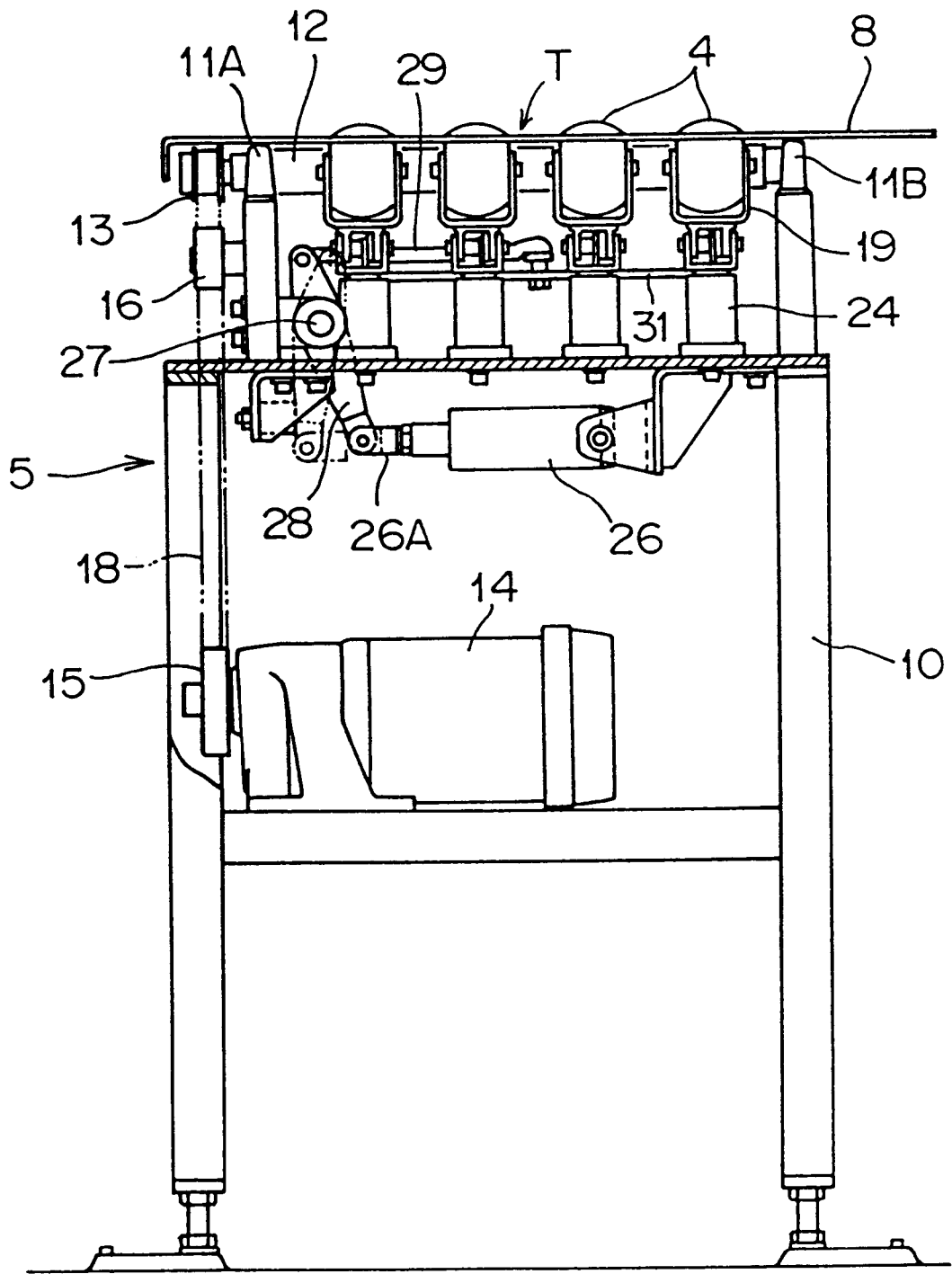
FIG. 3 is an enlarged cross-sectional view taken along line III—III of FIG. 1, showing a sorting transfer part of the article diverging sorting apparatus.

Referring to FIG. 3, there is shown a cross section of the sorting transfer unit 5 taken along line III—III of FIG. 1. As shown in FIG. 3, all of the spherical sorting rollers 4 arranged in a single row in the crosswise direction of the article conveyance line T are frictionally driven at one time by a line shaft 12 which extends transversely across the width of a frame 10 of the sorting transfer unit 5. The line shaft 12 is rotatably supported at opposite ends by a pair of bearings 11A, 11B mounted on the frame 10.

Figure 2:
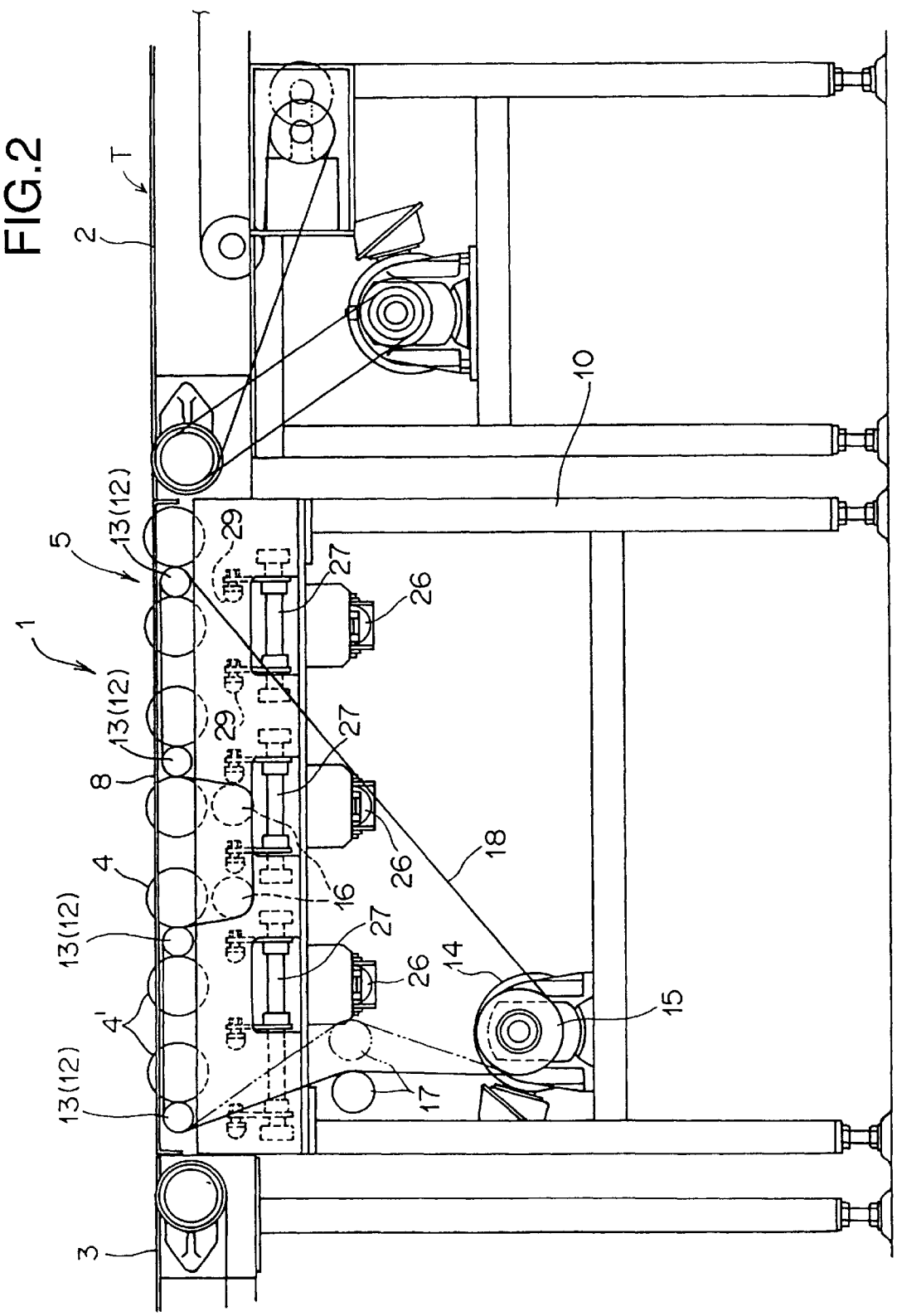
FIG. 2 is a side view of the article diverging sorting apparatus.

As shown in FIG. 2, the number of the line shaft 12 is plural and such plural line shafts 12 are disposed at predetermined intervals along longitudinal direction of the frame 10 (corresponding to the conveyance direction of the article conveyance line T). Each of the line shafts 12 has a driven toothed pulley 13 formed integrally with an end of the line shaft 12. A drive source such as an electric motor 14 is mounted to a lower portion of the frame 15. The motor 14 has a drive toothed pulley 15 attached to an output shaft of the motor 14. An endless toothed belt 18 extends around the drive and driven toothed pulleys 15, 13 via idle pulleys 16 and a tension pulley 17 so that all of the line shafts 12 are simultaneously driven to rotate in the same direction by means of the motor 14.

The tension pulley 17 is mounted on the frame 10 such that the position of the tension pulley 17 can be adjusted to regulate a tension in the toothed belt 18.

Figure 4:
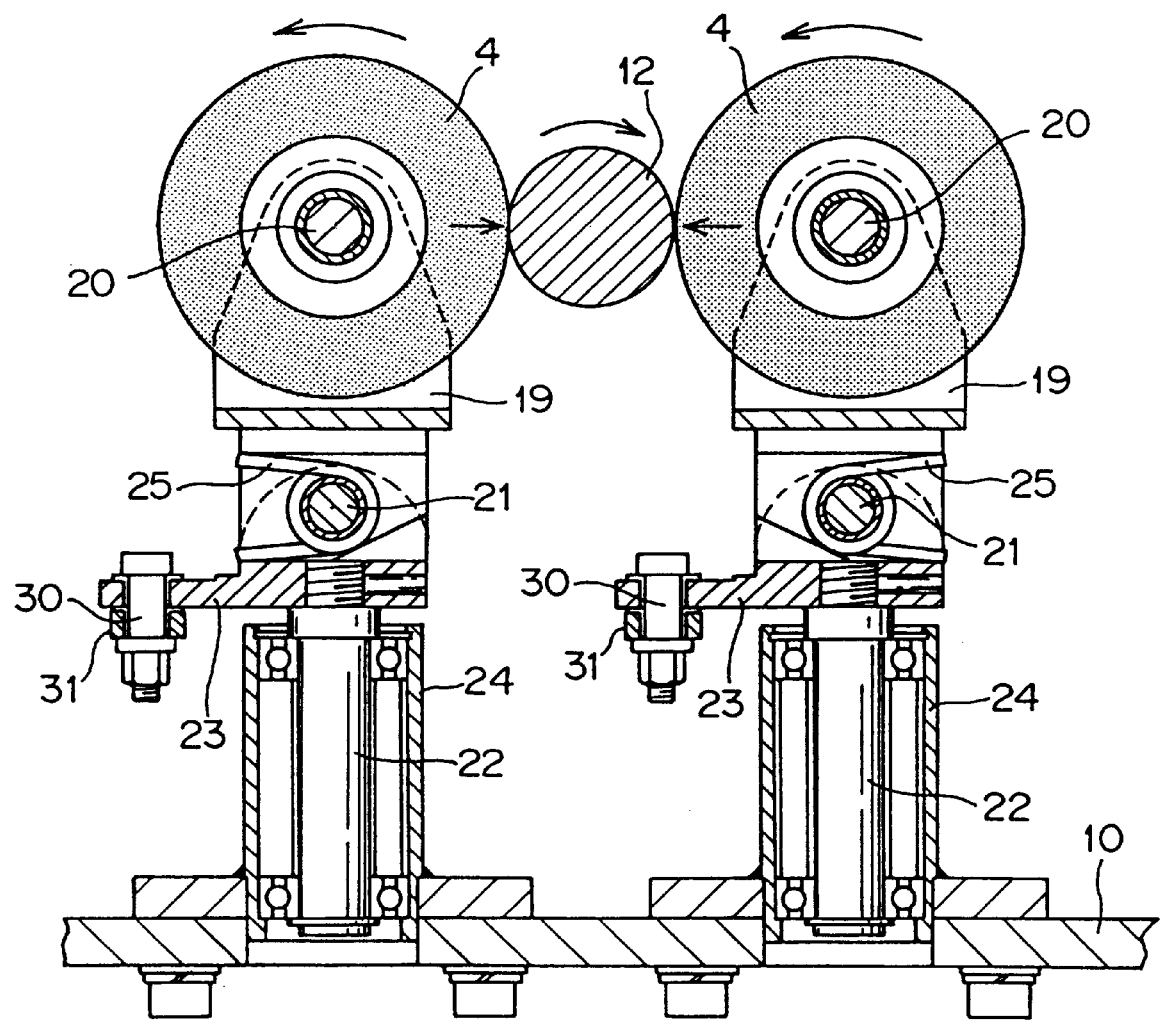
FIG. 4 is an enlarged view, partly in cross section, showing the manner in which spherical sorting rollers and a line shaft are in contact with each other.
Figure 5:
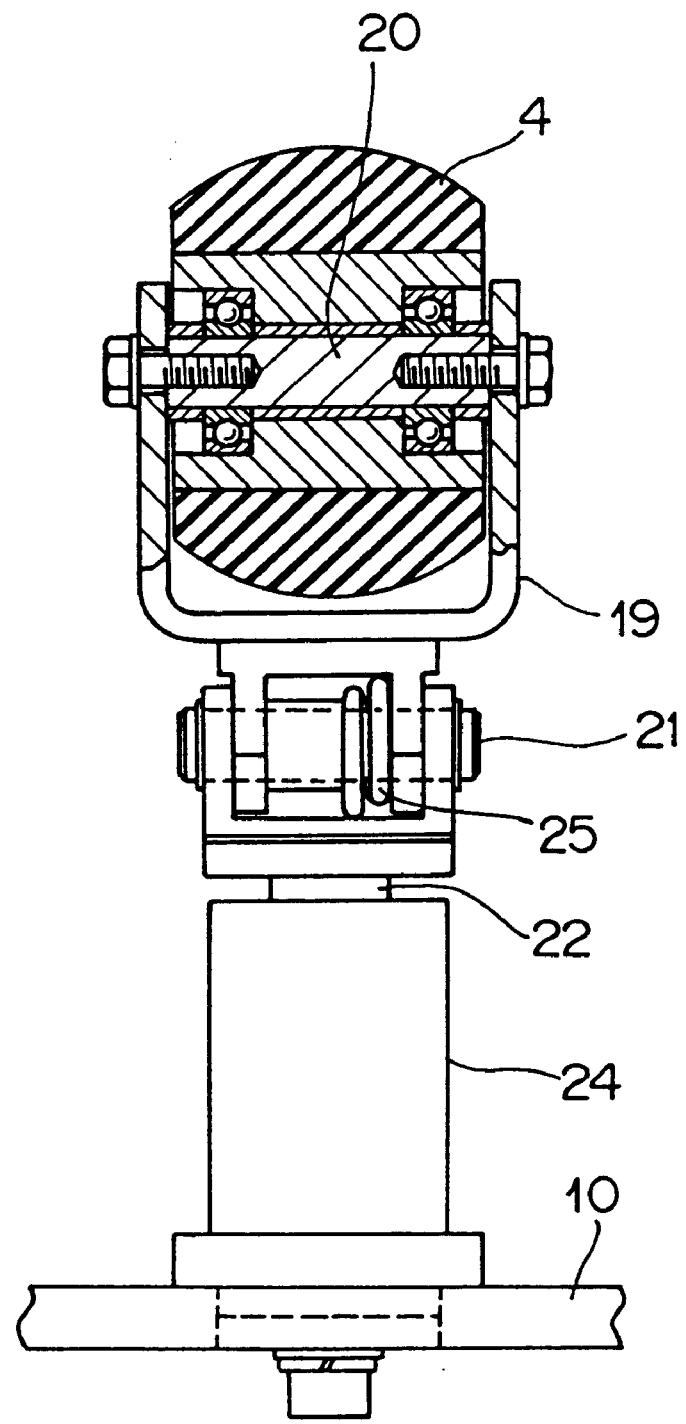
FIG. 5 is an enlarged view, with parts in cross section, of a support structure of the spherical sorting roller.

As shown in FIGS. 4 and 5, each of the spherical sorting rollers 4 is rotatably mounted on a roller support frame 19 via a horizontal roller support shaft 20 so that the roller 4 is rotatable about a horizontal axis.

The roller support frame 19 is pivotally connected by a horizontal joint shaft 21 to an upper portion of a swing arm 23 firmly secured to an upper end of a vertical roller swing shaft 22. The joint shaft 21 is in parallel with the roller support shaft 20.

The roller swing shaft 22 is rotatably supported by a pair of bearings (not designated) received in a bearing tube 24 fixedly mounted to the frame 10. Thus, the roller swing shaft 22 is rotatable about a vertical axis at a fixed position. The spherical sorting roller 4 is urged in a direction to keep frictional engagement with an adjacent one of the line shafts 12 by means of a torsion coil spring 25 which is wound around the joint shaft 21 and acts between the roller support frame 19 and the swing arm 23.

In the condition where the line shaft 12 and the spherical sorting roller 4 are in contact with each other, the center of the spherical sorting roller 4 and the midpoint of the joint shaft 21 are located substantially in vertical alignment with an axis of the roller swing shaft 22.

As shown in FIG. 3, an air cylinder 26 for simultaneously swinging plural spherical sorting rollers 4 is pivotally mounted to the frame 10. The air cylinder 26 has a piston rod 26A. The front end (outer end) of the piston rod 26A is pivotally connected by a pin (not designated) to a lower end of a rocker arm 28 which is rotatably supported at its central portion by a horizontal support pin 27 secured to the frame 10. The rocker arm 28 has an upper end pivotally connected by a pin (not designated) to one end of a link lever 29.

The other end of the link lever 29 is pivotally connected by a pin (not shown) to an intermediated portion of a connecting bar 31. As shown in FIG. 4, the connecting bar 31 pivotally connects together by a vertical pin 30 all the swing arms 23 provided in correspondence to respective ones of the spherical sorting rollers 4 arranged in the widthwise direction of the frame 10 (i.e., the crosswise direction of the article conveyance line T).

When the piston rod 26A of the air cylinder 26 is extended, the spherical sorting rollers 4 are simultaneously turned or swung via the rocker arm 28, link lever 29, connecting bar 31 and swing arm 23 to assume a different posture or orientation. Thus, these components 26, 28, 29, 31 and 23 jointly form a swing mechanism.

In the illustrated embodiment, three of the foregoing air cylinder 26 are provided to ensure that the spherical sorting rollers 4 contained in each of the conveyance areas X, Y, Z can be turned at one time and independent of movement of the spherical sorting rollers 4 in another conveyance area.

The two rows of spherical sorting rollers 4 arranged in the crosswise direction in the conveyance area X (FIG. 1) are constructed such that when driven by a first one of the three air cylinders 26 associated with the conveyance area X they angularly move or turn between a first position aligned with the conveyance direction and a second position deflected from the conveyance direction (first position) toward the diverging belt conveyor 6 by an angle α of 12 degrees. In other words, in the first position, the spherical sorting rollers 4 have a first posture oriented toward the conveyance direction of the article conveyance line T while in the second position they have a second posture oriented toward a sorting direction deflected at the angle α (12 degrees) from the conveyance direction.

Similarly, by means of a second one of the three air cylinders 26 associated with the conveyance area Y located immediately downstream of the conveyance area X, the two rows of spherical sorting rollers 4 arranged in the crosswise direction within this conveyance area Y are turn or swung between a first position aligned with the conveyance direction of the article conveyance line T and a second position deflected from the conveyance direction (first position) toward the diverging belt conveyor 6 by an angle β of 15 degrees.

In the conveyance area Z located immediately downstream of the conveyance area Y, three rows of spherical sorting rollers 4 arranged in the crosswise direction are driven by a third one of the three air cylinders 26 associated with this conveyance area Z such that the spherical sorting rollers 4 turn or swing between a first position aligned with the conveyance direction of the article conveyance line T and a second position deflected from the conveyance direction (first position) toward the diverging belt conveyor 6 by an angle γ of 35 degrees.

The angles should by no means be limited to 12°, 15°, 35°, respectively, and may take any other values on condition that they satisfy the inequity $\alpha<\beta<\gamma$.

In the illustrated embodiment, the straight-ahead conveyor rollers 4' in the conveyance area Z provided in juxtaposition with the conveyance area Z are rotatably driven by the line shaft 12 used in common with the spherical sorting rollers 4 in the conveyance area Z, but they are fixed in position and always oriented toward the conveyance direction of the article conveyance line T.

As shown in FIG. 1, the orientation correcting member 7 projecting over the conveyor surface of the diverging belt conveyor 6 is comprised of a turning roller 33 freely rotatable about a vertical shaft 32, and a fixed guide 34 having a vertical article guide surface S extending obliquely to the conveyance direction of the article conveyance line T in such a manner that one end (downstream end) of the guide surface S facing toward an outer peripheral surface of the turning roller 33, and the other end (upstream end) of the guide surface S located close to the conveyance area X of the article conveyance line T.

The article diverging sorting apparatus 1 of the foregoing construction operates as follows.

The belt conveyor 2, the spherical sorting rollers 4 and straight-ahead conveyor rollers 4' of the sorting transfer unit 5, and the belt conveyor 3 shown in FIGS. 1 and 2 are driven in synchronism with each other at substantially the same conveyance speed. At the same time, the diverging belt conveyor 6 shown in FIG. 2 is driven at a speed substantially equal to or slightly greater than the conveyance speed of the belt conveyors 2, 3 and rollers 4, 4'.

When an article W to be sorted onto the diverging belt conveyor 6 is fed by the belt conveyor 2 to a position close to a downstream end of the belt conveyor 2, a sensor (not shown) detects the presence of this article W and generates an output signal to activate the air cylinder 6 associated with the conveyance area X of the sorting transfer unit 5. Upon activation of the air cylinder 26, all of the spherical sorting rollers 4 arranged within the conveyance area X are simultaneously turned about their vertical axes until they assume a position 12 degrees deflected from the conveyance direction of the article conveyance line T toward the diverging belt conveyor 6.

Continued conveyance by the belt conveyor 2 causes the article W to leave the belt conveyor 2 and subsequently move onto the spherical sorting rollers 4 in the conveyance area X whereupon the direction of advancing movement and the posture of the article W is slightly turned toward the diverging belt conveyor 6.

When the article W enters the conveyance area X, the air cylinder 26 associated with the conveyance area Y is activated by a delay timer (not shown) so that all of the spherical sorting rollers 4 contained in this conveyance area Y simultaneously turn about their vertical axes to move through an angle of 15 degrees toward the diverging belt conveyor 6.

Continued conveyance by the spherical sorting rollers 4 in the conveyance area X causes the article W to leave the conveyance area X and move onto the spherical sorting rollers 4 in the next downstream conveyance area Y whereupon the direction of advancing movement and the posture of the article W is further turned toward the diverging belt conveyor 6. This is because the angle of deflection of the spherical sorting rollers 4 from the conveyance direction of the article conveyance line T is made greater in the conveyance area Y ($\beta=15°$) than in the conveyance area X ($\alpha=12°$).

When the article W moves in the conveyance area Y, the air cylinder 26 associated with the conveyance area Z is activated by a delay timer (not shown), causing all of the spherical sorting rollers 4 in this conveyance area Z to simultaneously turn about their vertical axes to move through an angle of 35 degrees toward the diverging belt conveyor 6.

Continued conveyance by the spherical sorting rollers 4 in the conveyance area Y causes the article W to enter the next downstream conveyance area Z whereupon the direction of advancing movement and the posture of the article W is further turned or deflected to a greater extent toward the diverging belt conveyor 6 by means of the spherical sorting rollers 4 in this conveyance area X. As the article W is further advanced by the spherical sorting rollers 4 contained in the conveyance area Z, a leading end portion of the article W is released from rolling engagement with the spherical sorting rollers 4 and moves onto an upstream end portion of the conveyor surface of the diverging belt conveyor 6.

With this advancing movement of the article W, the position of the center of gravity of the article W gradually shifts from the spherical sorting rollers 4 side toward the diverging belt conveyor 6. Concurrently therewith, a frictional force acting between the conveyor surface of the diverging belt conveyor 6 and the bottom surface of the article W increases gradually with the result that the leading end portion of the article W is pulled or drawn toward the conveyance direction of the diverging belt conveyor 6.

During that time, a trailing end portion of one sidewall of the article W is brought into contact with the turning roller 33 and then guided by the turning roller 33 while rotating the turning roller 33. As a result, the article W is further turned until it assumes a position accurately aligned with the conveyance direction of the diverging belt conveyor 6.

The article W thus turned through an angle of approximately 90 degrees is subsequently conveyed to a predetermined position by the diverging belt conveyor 6.

The fixed guide 34 used in combination with the turning roller 33 serves to rectify or correct the approaching position of the article W with respect to the diverging belt conveyor 6 so as not to cause mis-sorting which may occur due to collision between the leading end portion of the article W and the turning roller 33 when the article W which has been delivered from the belt conveyor 2 to the sorting transfer unit 5 is set off from the article conveyance line T toward the side on which the diverging belt conveyor 6 is provided.

The fixed guide 34 can be omitted when the articles W supplied from the belt conveyor 2 to the sorting transfer unit 5 are always in alignment with a transverse central portion of the of the sorting transfer unit 5. In place of the turning roller 33, the orientation correcting member 7 may include a fixed member having a smooth convex surface designed for sliding contact with a sidewall of each article W to guide the article W without damaging the sidewall.

Operation of the air cylinders 26 are controlled such that when one article W has left any one of the conveyance areas X, Y, Z, the spherical sorting rollers 4 in the one conveyance areas X, Y or Z are immediately returned to their original position if there is no article supplied to an immediately upstream one of the conveyance areas X, Y, Z as an article to be sorted onto the diverging belt conveyor 6.

In the case where an article W while being conveyed on the belt conveyor 2 is the article to be advanced in straight lines through the sorting transfer unit 5, the spherical sorting rollers 4 in the conveyance areas X, Y, Z are all held in the original position aligned with the conveyance direction of the article conveyance line T. Thus, the article W can move in straight lines through the conveyance areas X, Y, Z while they are carried on the spherical rollers 4. The article W is finally transferred to the belt conveyor 3.

In this instance, if the article W is followed by the next article W which is designed to be sorted onto the diverging belt conveyor 6, the spherical sorting rollers 4 in the conveyance area Z will be turned toward the diverging belt conveyor 6 in preparation for the conveyance of the next article W even though conveyance of the preceding article W from the conveyance area Z to the belt conveyor 3 has not fully completed. In this condition, a trailing end portion of the preceding article W is still partly carried on the spherical sorting rollers 4 in the conveyance area Z. However, since the remaining part of the trailing portion of the preceding article W is already carried on the straight-ahead conveyor rollers 4' in the conveyance area U disposed in juxtaposition with the conveyance area Z, the preceding article W is transferred onto the belt conveyor 3. In this instance, the posture and direction of advancing movement of the preceding article W is not altered.

According to the illustrated embodiment, because the conveyance area U containing the straight-ahead conveyor rollers 4' is disposed in juxtaposition with the conveyance area Z at a side which is remote from the diverging belt conveyor 6, it becomes possible to reduce the interval between the preceding article W which is to be advanced in straight lines toward the belt conveyor 3, and the next following article W which is to be sorted onto the diverging belt conveyor 6. With this reduction of article-to-article interval, the efficiency of the sorting operation increases correspondingly.

In the illustrated embodiment, the straight-ahead conveyor rollers 4' have the same spherical shape as the spherical sorting rollers 4. The spherical straight-ahead conveyor rollers 4' may be replaced with cylindrical rollers. Additionally, when the diverging sorting apparatus 1 is used with articles supplied in succession at relatively large intervals, the conveyance area U containing the straight-ahead conveyor rollers 4' may be omitted.

Figure 6:
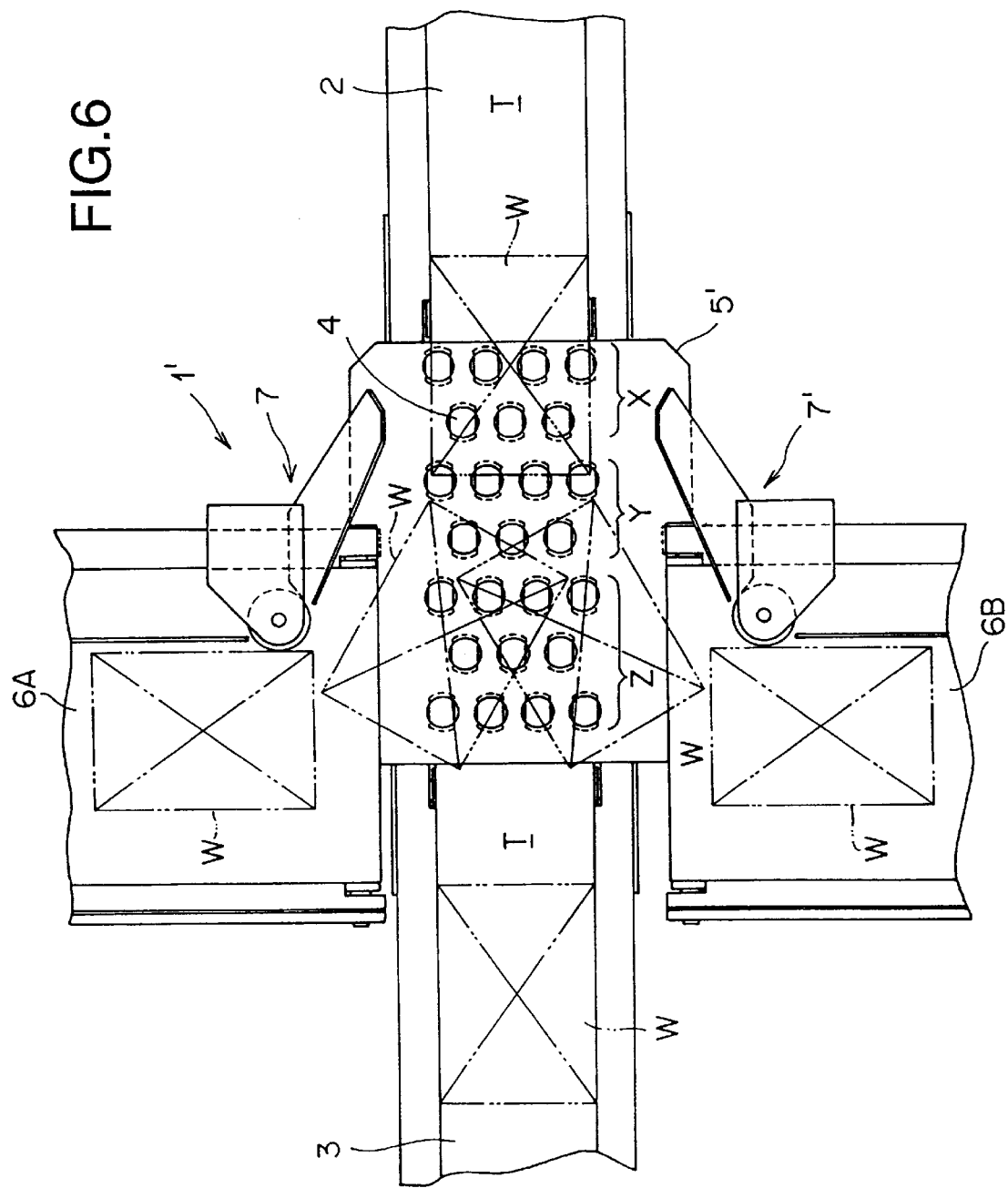
FIG. 6 is a plan view showing an article diverging sorting apparatus according to a second embodiment of the present invention.

Referring now to FIG. 6, there is shown an article diverging sorting apparatus 1' according to a second embodiment of the present invention. This apparatus 1' includes two diverging belt conveyors 6A, 6B disposed on opposite sides of a sorting transfer unit 5' so that the articles W supplied from a belt conveyor 2 to the sorting transfer unit 5' can be selectively delivered or sorted onto one of the diverging belt conveyors 6A, a belt conveyor 3 and the other diverging belt conveyor 6B that are arranged to extend in three different directions.

The diverging sorting apparatus 1' further includes two orientation correcting members 7, 7' disposed adjacent to the diverging belt conveyors 6A, 6B, respectively. These orientation correcting members 7, 7' are the same in construction as the orientation correcting member 7 of the foregoing embodiment shown in FIG. 1 and no further description thereof is needed.

The diverging sorting apparatus 1' has three consecutive conveyance areas X, Y, Z provided along an article conveyance line T in the order named when viewed from an upstream side of the article conveyance line T. Spherical sorting rollers 4 contained in the conveyance area X are designed to turn or swing in opposite directions to assume a first deflected position which is deflected from the non-deflected original position toward the diverging belt conveyor 6A at an angle of 12 degrees, and a second deflected position which is deflected from the non-deflected original position toward the diverging belt conveyor 6B at an angle of 12 degrees. Similarly, spherical sorting rollers 4 in the conveyance area Y are designed to deflect left and right at an angle of 15 degrees with respect to the non-deflected original position which is in alignment with the article conveyance line T. Spherical sorting rollers 4 in the conveyance area Z are designed to deflect left and right at an angle of 35 degrees with respect to the non-deflected original position (the article conveyance line T). To enable the spherical sorting rollers 4 to turn or deflect in opposite directions, three double rod air cylinders (not shown) are used in this embodiment in place of the single rod air cylinders 26 (FIG. 3) used in the foregoing embodiment shown in FIGS. 1 through 5.

Though not shown, the double rod air cylinders have two piston rods having a telescopic structure. When both piston rods are extended, the spherical sorting rollers 4 are deflected rightwards. By contrast, when both rods are contracted, the spherical sorting rollers 4 are deflected leftwards.

When one of the piston rods of the double rod air cylinder is extended and the other piston rod is contracted, the spherical sorting rollers 4 are oriented toward the conveyance direction of the article conveyance line T, i.e., they assume their original non-deflected position.

Other parts of the sorting transfer unit 5' are structurally the same as the corresponding parts of the sorting transfer unit 5 of the first embodiment. Sorting operation of the sorting transfer unit 5' with respect to each of the diverging belt conveyors 6A, 6B is substantially the same as the sorting operation of the sorting transfer unit 5 in the first embodiment previously described.

In the second embodiment, however, since the conveyance area Z extends throughout the width of the article conveyance line T, there is no room to arrange straight-ahead conveyor rollers in this conveyance area Z. Accordingly, the articles W should preferably be supplied from the belt conveyor 2 to the sorting transfer unit 5' at greater intervals than those employed in the first embodiment.

In the embodiments described above, the spherical sorting rollers 4 are arranged in the three consecutive conveyance areas X, Y, Z provided along the article conveyance line T. The number of the conveyance area should by no means limited to three as in the illustrated embodiments. At least two conveyance areas may provide the satisfactory results as described above.

The article conveyance line T may include two or more of the diverging sorting apparatus 1 (1') disposed at longitudinal intervals when much greater quantities of articles of different sorts are to be sorted.

The pneumatic cylinder actuators, such as the air cylinders 26 used for deflecting the spherical sorting rollers 4 may be replaced with rotary actuators.

Obviously, various changes and modifications of the invention are possible in the light of the above teaching. It is to be understood that within the scope of the appended claims the present invention may be practiced otherwise than as specifically described.

What is claimed is:

1. An article diverging sorting apparatus, comprising:

a multiplicity of spherical sorting rollers arranged in plural rows both in a conveyance direction and in a crosswise direction transverse to said conveyance direction over a plurality of consecutive conveyance areas provided along an article conveyance line, said conveyance direction being aligned with said article conveyance line;

a plurality of roller support frames each supporting thereon a corresponding one of said spherical sorting rollers for rotation about a horizontal axis and rotatable at a fixed position about a vertical axis passing substantially through a center of said corresponding spherical sorting roller;

a plurality of swing mechanisms separately operable to turn said roller support frames about the respective vertical axes to simultaneously swing the spherical sorting rollers in each of the conveyance areas between a first position aligned with said conveyance direction and a second position aligned with a sorting direction deflected at an acute angle from said conveyance direction such that the angle of deflection of said spherical sorting rollers becomes greater in a downstream one of said conveyance areas than in an upstream one of said conveyance areas;

a plurality of line shafts each disposed in parallel with and alongside one of said plural rows of spherical sorting rollers arranged in the crosswise direction of said article conveyance line, said line shafts being in contact with respective spherical outside surfaces of said spherical sorting rollers for frictionally driving said spherical sorting rollers to rotate simultaneously;

a drive unit for simultaneously rotating said line shafts in synchronism with each other;

a diverging belt conveyor having a conveyance direction intersecting said article conveyance direction and disposed with its upstream end positioned close to one side of a group of said spherical rollers in said downstream conveyance area; and an orientation correcting member disposed adjacent to said upstream end of said diverging belt conveyor at a side facing upstream of said article conveyance line, said orientation correcting member projecting above a conveyor surface of said diverging belt conveyor for engagement with an article to assist change-direction movement of the article when the article is delivered from the spherical sorting rollers to said diverging belt conveyor.

2. An article diverging sorting apparatus according to claim 1, wherein said article conveyance line further includes an additional conveyance area provided in juxtaposition with said downstream conveyance area at an opposite side of said spherical sorting roller group in said downstream conveyance area which is located remotely from said diverging belt conveyor, said additional conveyance area including a plurality of rows of straight-ahead conveyor rollers fixedly oriented toward said conveyance direction of said article conveyance line.

3. An article diverging sorting apparatus according to claim 2, wherein said straight-ahead conveyor rollers have the same spherical shape as said spherical sorting rollers.

4. An article diverging sorting apparatus according to claim 1, wherein said orientation correcting member includes a turning roller rotatable about a vertical axis and having an outer peripheral surface for engagement with the article when the article is delivered from said downstream conveyance area to said diverging belt conveyor.

5. An article diverging sorting apparatus according to claim 4, said orientation correcting member further includes a fixed guide having a vertical guide surface for sliding contact with the article and extending obliquely to said article conveyance line such that one end of said fixed guide is located adjacent to said turning roller and an opposite end faces toward said upstream conveyance area.

* * * * *

UNITED STATES PATENT AND TRADEMARK OFFICE
CERTIFICATE OF CORRECTION

PATENT NO. : 6,073,747
DATED : June 13, 2000
INVENTOR(S) : Takino et al.

It is certified that error appears in the above-identified patent and that said Letters Patent is hereby corrected as shown below:

<u>Title page,</u>
After "[22] Filed: Jan. 27, 1999" insert:
-- [30] Foreign Application Priority Data
Jan. 29, 1998 [JP] Japan.........17365/1998

Signed and Sealed this

Twenty-first Day of August, 2001

Attest:

*Nicholas P. Godici*

NICHOLAS P. GODICI
*Attesting Officer*     *Acting Director of the United States Patent and Trademark Office*